June 15, 1943.  D. C. SCOTT  2,322,100
CONSTANT RATE OF LOAD TESTING APPARATUS
Filed Feb. 5, 1940  2 Sheets-Sheet 1

CONSTANT SPEED MOTOR

INVENTOR.
David C. Scott
BY Barlow & Barlow
ATTORNEYS.

June 15, 1943. D. C. SCOTT 2,322,100
CONSTANT RATE OF LOAD TESTING APPARATUS
Filed Feb. 5, 1940 2 Sheets—Sheet 2
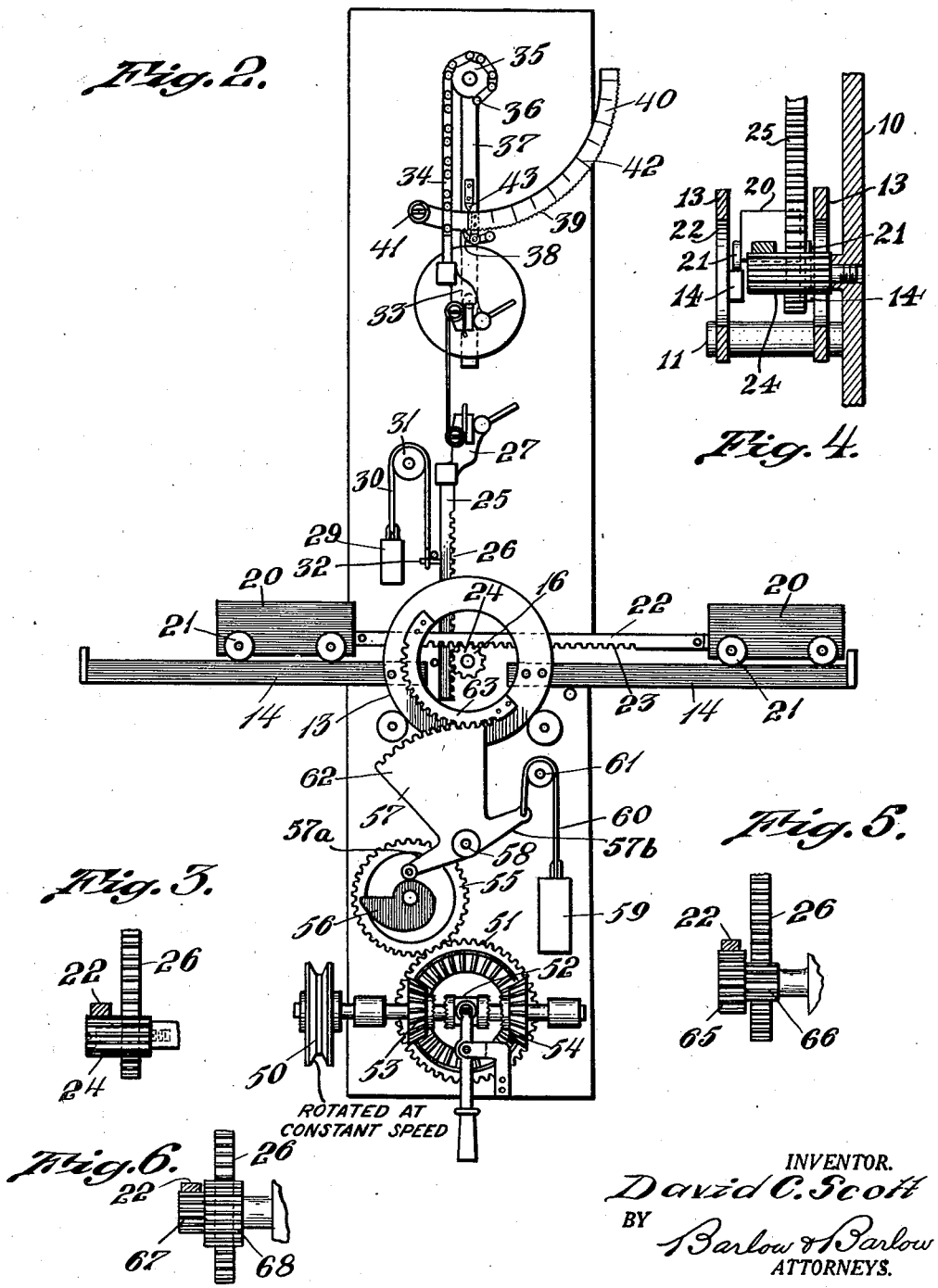
INVENTOR.
David C. Scott
BY Barlow & Barlow
ATTORNEYS.

Patented June 15, 1943

2,322,100

UNITED STATES PATENT OFFICE 2,322,100

CONSTANT RATE OF LOAD TESTING APPARATUS

David C. Scott, Providence, R. I., assignor to Henry L. Scott Company, a corporation of Rhode Island Application February 5, 1940, Serial No. 317,277

10 Claims. (Cl. 265—17)

This invention relates to a machine for load measurement, and more particularly for exerting a constant load rate upon the specimen; and the invention has for one of its objects to provide for the measurement of the strain on a specimen as a result of the applied stress.

Another object of the invention is to provide for the indication of the stress applied to the specimen by the operation through the specimen of the indicating means, as distinguished from the operation of the indicating means directly from the mechanism for applying the load.

Another object of the invention is the provision of a balanced arrangement on an inclinable runway upon which the load-applying means is supported for operation.

A further object of the invention is the tilting of the runway about its center point and yet maintaining a rate of inclination which will provide for a constant load rate applied to the specimen.

With these and other objects in view, the invention consists of certain novel features of construction, as will be more fully described and particularly pointed out in the appended claims.

In the accompanying drawings:

Fig. 2 is a view similar to Fig. 1, but showing a modification of the means for tilting the runway;

Fig. 3 is a sectional view illustrating the arrangement of the center pinion and racks and is a section on substantially line 3—3 of Fig. 1;

Fig. 4 is a sectional view, partly broken away showing the location of the center pinion and racks with respect to the tilting runway; and Figs. 5 and 6 are views, similar to Fig. 3, of a modified arrangement.

Figure 1:
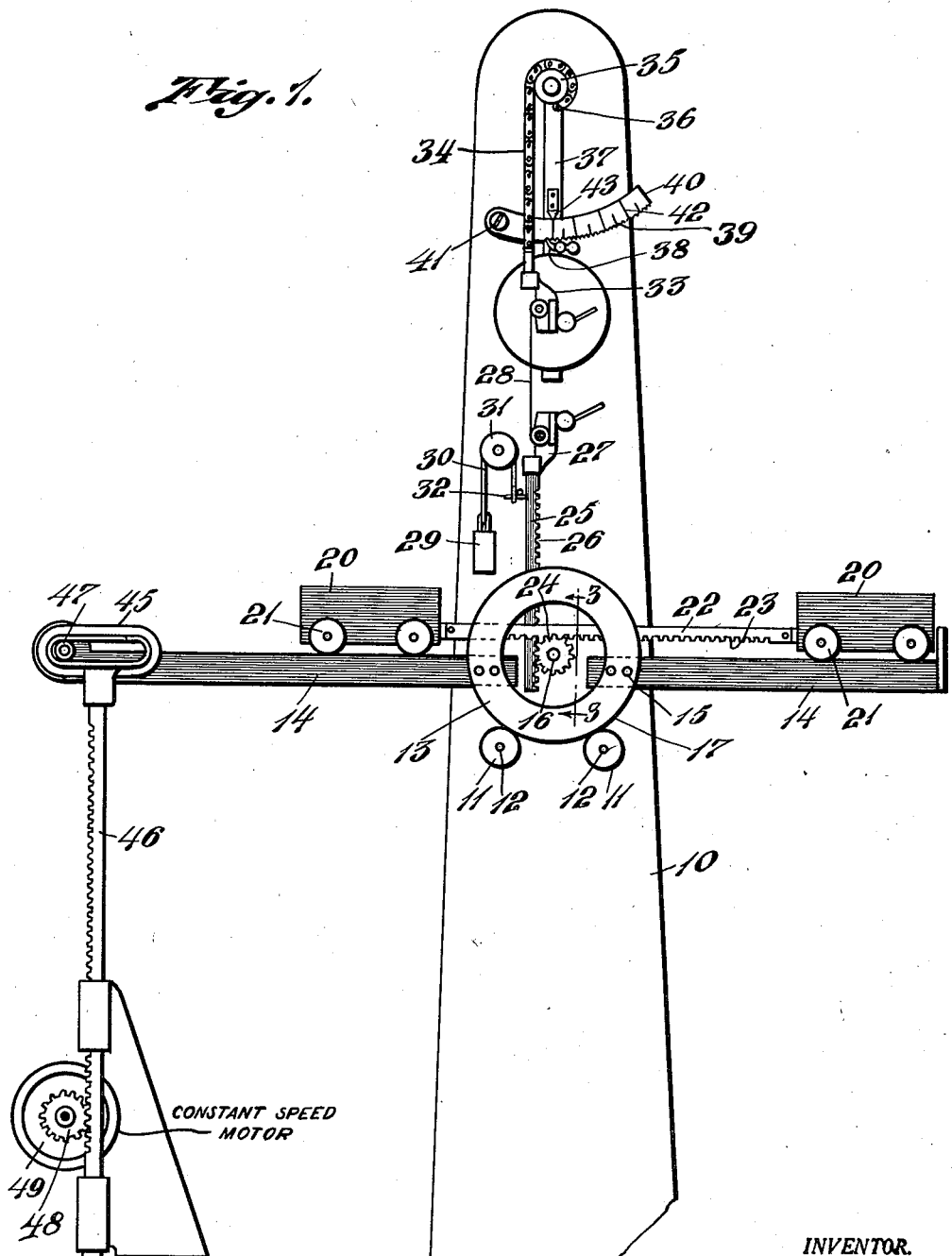
Fig. 1 is a sectional view, largely diagrammatic, illustrating a frame with the moving parts mounted thereon.

In the testing of specimens by suitable machines, it has been found that the elasticity of the specimen and the rate of application of the load have an important bearing on the ultimate test. It is desirable to cause these factors to be substantially uniform where comparative results are to be had. It has also been found desirable to provide a uniformly increasing load upon the specimen being tested with some arrangement so that any stretch or deflection of the specimen will be compensated for while such load is applied without affecting the rate of application of the load. In order that this may be accomplished, I have provided an inclinable runway for supporting weights which will move along and apply stress to the specimen as the runway is inclined. I have arranged to incline this runway at a varying angular rate which will be so arranged that the weight will apply a constant rate of load to the specimen. The mathematical relation being that the rate of inclination of the runway will be in direct proportion to the sine of the angle which the runway will make with the horizontal plane passing through its pivotal point. The following is a more detailed description of the present embodiment of this invention, illustrating the preferred means by which these advantageous results may be accomplished:

With reference to the drawings, 10 designates the frame of a machine from which there projects axles 12 upon which rollers 11 are mounted. These axles 12 may be suitably supported at their ends toward the observer where the machine will be of sufficient size and weight to require such additional support. In light structures, however, as here shown, the axles 12 may extend from the frame 10 and be sufficiently strong for operative purposes.

A runway is supported upon these rollers 11 and consists of a center section 13 and side sections 14, all secured together as a single movable unit, such for instance as by bolts 15. This runway supports suitable weights for applying load to the specimen as hereinafter described.

The runway is pivotally mounted about a center 16 by means of its center section 13 being supported upon the rollers 11; that is, the outer surface 17 of the center section 13 is of such a size and is truly concentric with the center 16 so that when supported on the rollers 11 and rocked to rotate these rollers, the center section 13 will move in a truly circular orbit about the center 16. Any segment of a circle of the center section sufficient to connect the end sections and perform the desired angular traverse of the runway about the center 16 will be satisfactory, although I have illustrated this center section as consisting of two spaced annuluses in order to provide greater strength of construction.

Weights 20 are supported by means of rollers 21 upon the runway 14. I have illustrated two such weights, one on each runway section 14 at each side of the center section so that a balanced arrangement is provided. These weights are connected together by a rack 22 having teeth 23 which mesh with a pinion 24 pivotally mounted about center 16 so that as the weights move along the runway, the pinion 24 will be rotated. This pinion also engages a rack 25 having teeth 26 to mesh with the teeth of the pinion so that as the pinion moves, its motion will be transmitted in a linear direction to the rack 25. The guides for this rack will be of a suitable character which are not here illustrated, as it is not deemed important that they be shown in order to illustrate the invention involved.

At the end of this rack there is a clamp 27 for the gripping of one end of a specimen 28, while the clamp and rack are counterbalanced by weight 29 having flexible element 30 trained over the pulley 31 and attached to the rack as at 32. The other end of the specimen is gripped by a clamp 33 to which a sprocket chain 34 is attached, which embraces sprocket wheel 35 and is fixed thereto as at 36. The sprocket wheel also has an arm 37 fixed thereto and extending therefrom with a pawl 38 pivoted upon the arm 37 for engagement with ratchet teeth 39 on the arcuate member 40 fixed as at 41 to the frame and provided with indicating marks 42 on its surface. The pointer 43 on the arm 37 indicates the extent to which the arm is raised along the indicator and thus shows the stress applied to the specimen.

In order that the runway 13, 14, 14 may be inclined, I have provided a scotch cross-head 45 on the end of a rack 46. This cross-head engages the anti-friction roll 47 which has its center on the line of support of the weight 20 which line also passes through pivot 16. As the rack 46 is drawn downwardly by pinion 48 operated by a motor 49, the runway will be inclined and the weights will, through the rack 22, pinion 24 and rack 25, apply stress on the specimen 28. This stress will be applied at a uniform rate due to the uniform operation of the pinion 48 and the movement of the rack 46 vertically; and, although the angle made with the horizontal at the pivot point 16 will vary, the rate of change of the sine of the angle represented by the movement of the rack 46 will remain constant, and accordingly, the rate of application of the load will be constant or uniform.

In Fig. 2, I have illustrated a different means of inclining the runway 14, 13, 14. Here, instead of lowering one end of the runway, I have applied a turning movement to the runway about its pivotal point 16. When turning movement at this location is applied, a compensation must be introduced in order that the rate of turning may be properly governed. In this case, I illustrate the pulley 50 which is driven at a constant speed from some suitable source. Gear 51 may be rotated in either direction from this pulley by engagement of the clutch 52 with either gear 53 or gear 54. Gear 51 in turn drives gear 55 which operates cam 56 through which motion is transmitted to the rack segment 57 pivoted as at 58 and counterbalanced by means of weight 59 secured to a flexible element 60 which is trained over the pulley 61 and fixed to an arm 57b extending from the segment 57. This rack segment 57 is provided with teeth 62 engaging the arcuate tooth segment 63 secured to the center segment 13 of the inclinable runway. The entire motion of the runway is thus governed by the cam 56, it being so shaped as to provide a varying rate of angular motion of the runway which rate will be such that the sine of the angle made by the rolling surface and the horizontal will vary at a constant rate.

In some cases, it may be desirable to provide a compound arrangement for transmission of the movement of the weights to the rack 25. In Fig. 5 the rack 22 engages a gear 65 which is larger than the gear 66, fixed thereto, with which the rack teeth 26 engages. In Fig. 6 the rack 22 engages a gear 67 which is smaller than the gear 68, fixed thereto, with which the rack teeth 26 engage. Thus in one instance the weight produces more load, and in the other instance, the weight produces less load but travels through a different distance.

The foregoing description is directed solely towards the construction illustrated, but I desire it to be understood that I reserve the privilege of resorting to all the mechanical changes to which the device is susceptible.

I claim:

1. In a specimen testing apparatus, load applying means comprising a pair of spaced roller supports, rollers on said supports, an arcuate segment engaging said rollers to be movable in an orbit upon said rollers about a fixed center, inclinable runways carried by said segment on opposed sides thereof and movable therewith, a pair of weights rollable along said runways, a rack connecting said weights together, a pinion gear meshing with and operable by said rack, and means actuated by said pinion gear to load a specimen.

2. In an apparatus of the character described, load-applying means, comprising an inclinable runway, a pair of spaced weights rollable along said runway, a rack connecting said weights, a pinion having a common center with that point about which the runway is inclined and meshing with said rack, a second rack extending at an angle to said first rack and meshing with said pinion and through which pinion and rack arrangement load is applied to a specimen as the runway is tilted.

3. In a testing apparatus, specimen holding means, load applying means therefor comprising a pair of spaced supports, means providing spaced arcuate segments engaging said supports to be movable relative to said supports about a fixed center, inclinable runways secured to and extending in opposite directions from between said segments and movable therewith, a member rotatably mounted to move about said fixed center and positioned at a location to extend within the space between said segments, weights rollable along said runways and means movable in a plane parallel with said supports positioned between said segments and secured to said weights and engaging said rotatable member to rotatably move the same to load a specimen as the runways are tilted.

4. In a testing apparatus, a specimen holding means, load applying means therefor comprising a pair of spaced supports, spaced arcuate segments engaging said supports to be movable relative to said supports about a fixed center, inclinable runways secured to and extending from between said segments and movable therewith, a pinion gear rotatable about said fixed center and positioned at a location to extend within the space between said segments, a pair of weights spaced from each other and rollable along said runways, a rack connecting said weights and extending between said segments and meshing with said pinion to rotatably move the same to load a specimen as the runway is tilted.

5. In a testing apparatus, specimen holding means, load applying means therefor comprising a rotatable member movable about a fixed center and having inclinable runways extending therefrom, an arcuate segment fixed to said rotatable member, and means operably connected to said segment for moving the same to incline said runways and weights on the runways to load the specimen.

6. In an apparatus of the character described, specimen holding means, load applying means therefor comprising runways inclinable about a fixed point, weights movable along the runways, a gear fixed to said runways and movable about said fixed point to incline said runways, gear means operable for moving said gear including a cam by which said gear means operate for controlling the rate at which said runways are inclined whereby the rate of applied load may be controlled as the runways are tilted.

7. In an apparatus of the character described, specimen holding means, load applying means therefor comprising runways inclinable about a fixed point, weights movable along the runways, a member having a cam surface, a gear segment fixed to said runways and movable about said fixed point to incline said runways, a second gear segment meshing with the said first gear segment and having an arm extending therefrom into engagement with said cam surface and by which arm and cam surface said second gear segment is moved whereby to control the rate at which said runways are inclined and the rate of applied load may be controlled as the runways are tilted.

8. In an apparatus of the character described, specimen holding means, load applying means therefor comprising a runway inclinable about a fixed point, a weight movable along the runway, a rotatably mounted cam, a gear segment fixed to said runway and movable about said fixed point to incline said runway, a second gear segment meshing with the said first gear segment and having arms extending therefrom, one of which engages said cam and the other of which is provided with a counterbalance, and means for rotating said cam to move the said first gear segment at a controlled rate of rotation to control the rate at which said runway is inclined, whereby the rate of applied load may be controlled as the runway is tilted.

9. In an apparatus of the character described, specimen holding means, load applying means comprising a runway, a weight rollable along said runway with reference thereto, said runway being inclinable about a fixed point, an arcuate gear member secured to said runway and movable about said fixed point, a gear segment for actuating said arcuate gear member to incline said runway and a cam through which said gear is operated for inclining said runway at a rate corresponding to the sine of the angle made by the runway with a horizontal plane through said fixed point, whereby the rate of applied load may be definitely controlled.

10. In a specimen testing apparatus, specimen holding means, an arcuate segment spaced from and movable about a fixed center, inclinable runways secured to and movable with said segment and extending therefrom in opposite directions, a member rotatably mounted to move about the fixed center and positioned at a location rearwardly of said segment and of substantially less diameter than said segment, load applying means operatively connected to and movable by said rotatable member for applying a load on the specimen holding means and means operatively connected to said rotatable member and movable along said runways upon the tilting of said runways to move said movable member to load the specimen.

DAVID C. SCOTT.